(12) United States Patent
Benson et al.

(10) Patent No.: US 9,566,869 B1
(45) Date of Patent: Feb. 14, 2017

(54) ELECTRIC SERVICE CRANE FOR IDLE EQUIPMENT

(71) Applicants: G. Samuel Benson, Springfield, MO (US); Ronald Woods, Springfield, MO (US)

(72) Inventors: G. Samuel Benson, Springfield, MO (US); Ronald Woods, Springfield, MO (US)

( * ) Notice: Subject to any disclaimer, the term of this patent is extended or adjusted under 35 U.S.C. 154(b) by 123 days.

(21) Appl. No.: 14/695,960

(22) Filed: Apr. 24, 2015

(51) Int. Cl.
*B60L 1/00* (2006.01)
*H02B 1/01* (2006.01)
*B60L 11/18* (2006.01)

(52) U.S. Cl.
CPC .......... *B60L 11/1816* (2013.01); *B60L 11/182* (2013.01); *H02B 1/01* (2013.01)

(58) Field of Classification Search
CPC .... B61K 11/00; B60L 11/1816; B60L 11/182; H02B 1/01
See application file for complete search history.

(56) References Cited

U.S. PATENT DOCUMENTS

| | | | |
|---|---|---|---|
| 4,158,802 A | 6/1979 | Rose, II | |
| 5,646,500 A | 7/1997 | Wilson | |
| 6,157,162 A | 12/2000 | Hayashi et al. | |
| 6,305,678 B1 * | 10/2001 | Hammersmith | B23K 37/047 269/71 |
| 6,732,770 B1 | 5/2004 | Nusbaumer et al. | |
| 6,948,538 B1 | 9/2005 | Nusbaumer et al. | |
| 8,143,841 B2 | 3/2012 | Gochenaur | |
| D676,376 S | 2/2013 | Yamada et al. | |
| 8,400,106 B2 | 3/2013 | Midrouillet et al. | |
| 8,473,131 B2 | 6/2013 | Leary | |
| 2014/0314538 A1 * | 10/2014 | Carter | A61B 19/26 414/744.3 |
| 2016/0059257 A1 * | 3/2016 | Diskin | B60S 3/047 248/75 |

FOREIGN PATENT DOCUMENTS

| | | | | |
|---|---|---|---|---|
| GB | EP0084249 A2 * | 7/1983 | | B25J 9/046 |
| JP | 10054054 A * | 2/1998 | | |

* cited by examiner

*Primary Examiner* — Robert J Hoffberg
(74) *Attorney, Agent, or Firm* — Richard L. Marsh

(57) ABSTRACT

An electric service crane has a vertical swivel, a horizontal swivel, a bracket, a service cabinet, a boom and a boom retraction device mounted on a mounting pedestal. The vertical swivel permits the horizontal swivel, bracket, service cabinet, boom and boom retraction device to rotate about the pedestal within an arc to provide electrical service to idle equipment.

20 Claims, 4 Drawing Sheets

ELECTRIC SERVICE CRANE FOR IDLE EQUIPMENT

BACKGROUND OF THE INVENTION

1. Field of the Invention

This invention relates to electric service for idle equipment such as locomotives, automobiles, trucks, airplanes, ships and construction equipment. Specifically, an electric service crane is described to provide power to the idle equipment for onboard equipment.

2. Prior Art Statement

When equipment is temporarily idled, onboard electric service is required to keep batteries charged, fuel from gelling and communication equipment active and/or readied for service. Typically, an electric cable is available lying on a base surface such as the ground, wood or steel decking, concrete driveways, docks or gravel paths that must be dragged to the idle equipment and connected to a service port on the idle equipment. Damage to the outer sheathing of the electric cable often occurs from movement across the base surface producing safety related handling hazards as well as frequent replacement of the cable. Therefore, there is a great need for an electric crane that elevates the mating cable connector and the cable above the base surface wherein the crane can easily be moved to position the mating cable connector at the service port on the idle equipment and remain at that position until released. The crane is capable of nearly complete rotation on a pedestal, movement from a vertical position to a near horizontal position and means to return the crane to the vertical position. The crane mount has an electric control cabinet mounted to connect and disconnect the electric service. The mating cable connector is held above the average head height of an individual when the crane is in a vertical position.

An improvement over cables lying upon a base surface is described in U.S. Design Pat. D 676,376 S issued on 19 Feb. 2013 to Yamada, et al. This design copies the typical gasoline pump model. A storage port connected to a looped cable in turn connected to a power providing device. The looped cable is stored on a pair of brackets alongside the power device. Though this improvement ostensibly keeps the cable from being dragged along the base surface, it is well known that many users are not careful in replacing the cable on the brackets and thus damage still occurs. Ergo, there is a great need for an electric service crane that maintains the electric cable above a base surface to protect the cable from damage and that also can provide electric service to many locations within a forty foot radius.

It is known to provide electric service to an airplane wherein the electric cable is located alongside the jetway and moves in concert with the jetway. The cable is reeved on the arms of the scissors extension of the jetway. Though it is convenient that the service connection for airplanes is proximate the nose of the aircraft and thus also proximate the jetway door of the aircraft, the connector and cable move only where the jetway moves and thus is not useable for other idle equipment that is not exactly positioned. It is obvious that the arm does not move with the cable connector when coupling to the airplane. Accordingly, the still exists a great need for an electric service crane that is rotatable about a pedestal and positioned by merely pulling on the connector.

It is also known to provide an automated electric vehicle storage and renting facility that has an automatic induction charging station comprising a robot to couple a charging probe to the vehicle charging port. The robot has a first arm horizontally rotatable on its upper surface, a second arm horizontally rotatably attached to one end of the first arm and the charging probe horizontally rotatably attached to the free end of the second arm. The robot arms may also be moved vertically thus giving with X, Y, Z axis motions. Finding the positioning of the vehicle is accomplished radio frequency communication with the vehicle. For instance, see the U.S. Pat. No. 6,157,162 issued on 5 Dec. 2000 to Hayashi, et al. No manual effort is needed to position the charging probe of the charging operation but the charging mechanism is costly to install, maintain and operate. Additionally, the reach of the probe is limited by the short arms and longer arms would be difficult to position easily. Therefore, the great need for a simple manually positionable electric crane still exists wherein the crane is rotatably mounted on a pedestal and is manually lowered into position by grasping and pulling on the electric connector, the electric connector attached to an elongated cable pending from the crane.

It is further known to provide an indoor automatic induction charging station comprising a probe coupled to a charging port on a vehicle by translating the probe vertically and horizontally along a vertical plane to position the probe in alignment with the charging port on the vehicle. The probe is then axially moved perpendicular to the plane into the charging port. Locating the probe in position is accomplished by photo electric detectors receiving a signal from the vehicle. For instance, see the U.S. Pat. No. 5,646,500 issued on 8 Jul. 1997 to David T. Wilson. As with Hayashi, et al., no manual effort is needed to position the charging probe of the charging operation but this charging mechanism is also costly to install, maintain and operate. To make the device large enough to service locomotives, large off road equipment or ships would require great capital outlay and require significant maintenance in these harsher environments. Therefore, the great need for a simple manually positionable electric crane still exists wherein the crane is rotatably mounted on a pedestal and is manually lowered into position by grasping and pulling on the electric connector thus tipping the crane toward the operator, wherein a proof circuit is included to ensure that proper electric connection is made between the service port on the idle equipment and the mating cable connector.

Likewise, it is known to provide a system of providing power to electric vehicles has a plurality of docking stations controlled by an electronic coordinator through the internet. The docking stations have a jointed probe for X, Y, Z motions that is terminated with a coupling device. The coupling may be physical, magnetic or optic, the latter two transmitting power by induction. Power to the system comes from the grid but the controller may provide power from connected EV's to the grid if needed. For instance, see the U.S. Pat. No. 8,473,131 B2 issued on 25 Jun. 2013 to Kevin Walter Leary. The device is similar to Hayashi, et al., except that the articulated arms move in vertical planes as opposed to horizontal planes and thus has the same limitations of reach of the probe because of the necessarily short arms. It is therefore obvious that the need for a simple manually operated electric service crane with significant reach is still needed. Specifically, the electric service crane is located in limited space yet still has a long reach to be able to service idle equipment within a forty foot radius.

Further known is a system wherein a capacitor is charged at each vehicle station by local power. When a vehicle such as a bus stops at the station, power is transferred to the vehicle by induction or physical contact and stored in a second capacitor on the vehicle. A battery is also kept charged as excess power as the on board capacitor flows through to the battery. The on board battery and/or capacitor of the vehicle may also charge by regenerative braking Transfer of power is completed in 5 to 25 seconds at 400-800 volts and 500 amps. The vehicle usually charges at each station and receives enough power to get to the next station. For instance, see the U.S. Pat. No. 8,400,106 B2 issued on 19 Mar. 2013 to Midrouillet, et al. Though useful for short term usage such as getting to the next charging station, this device would not work well for auxiliary power for idle equipment as a continuous source of energy is needed. Accordingly, the need for a simple, manually operated electric service crane is still present. More specifically, an electric crane capable of reaching idle equipment within forty feet with a manually connected connector is greatly needed.

A charging shelter is provided with a plurality of cable reels for providing charging power to vehicles. Solar power is the primary source for the charging shelter. For instance, see the U.S. Pat. No. 8,143,841 issued on 27 Mar. 2012 to David J. Gochenaur. The vehicle requiring power must be at the position of the cable reel as the cable on the reel is relatively short. Furthermore, the cable on the cable reel is limited by the small cable reels as the cable must be small in diameter to reel easily. Consequently, there is a significant need for a simple electric service crane that can be tipped from a vertical position to a desired angle, held in that position by an arresting device, rotated about a pedestal to position an electric service connector proximate a service port on an idle vehicle.

It is now known to charge an electric vehicle by wheeled probes extending from a ceiling of a garage or the like. The top of the vehicle has contacts on the roof surface to receive the wheeled probes. A switch may be provided in the vehicle for stopping the charging operation. For instance, see the U.S. Pat. No. 4,158,802 issued on 19 Jun. 1979 to William R. Rose II. Alignment of the vehicle to the charging station is critical and thus the process of charging is limited to a single location so a substantial need exists for a charging location that can provide electric service to any one of multiple idle vehicles within a forty foot radius of a charging pedestal wherein the pedestal carries a long arm crane with a long electric cable pending from the tip of the crane arm.

Applicants are aware of methods to provide electric service to electric vehicles with a design similar to a typical gasoline pump. A storage port is connected to a looped cable in turn connected to a power providing device. The looped cable is stored on a pair of brackets alongside the power device. For instance see the U.S. Design Pat. D 676,376 S issued on 19 Feb. 2013 to Yamada, et al. Dragging the cable over the base surface is still present with this apparatus as nothing supports the cable above the base surface. Accordingly, there is still a great need for an electric service boom that supports the connector above a base surface while still providing sufficient reach to service any one of many vehicles from a single port disposed between two vehicle paths wherein the electrical service boom is returned to an upright vertical position upon actuation of a release mechanism.

Finally, it is known to provide a fueling crane for fueling locomotives at a fueling station alongside an active track. For instance, see the U.S. Pat. No. 6,732,770 issued on 11 May 2004 and 6,948,538 B1 issued on 27 Sep. 2005 issued to Nusbaumer, et al. Fuel is pumped through an upright attached to a base, through a rotary coupling to permit the fuel crane to rotate relative to the base, through a second rotary coupling allowing the articulated boom of the fueling crane to pivot downwardly, through the articulated boom to a nozzle disposed at the end of the articulated boom. Multiple seals are required to prevent fuel from escaping at every moving joint. The articulated boom has means to return the boom to the upright position but retains a tension on the boom while the nozzle is locked to a locomotive fuel tank. Therefore, there is a need for an electric service crane that retains a given position once deployed without putting a tension on the electric service cable or its connector. Additionally, the need for an electric service crane that elevates the electric service cable above the ground surface is still present.

SUMMARY OF THE INVENTION

One object of this invention is to provide an electric service crane that has a mounting pedestal, a vertical rotary coupler, a horizontal rotary coupler, a bracket, a service cabinet, an electric service boom and a boom retraction device. The bracket is affixed to a top end of the vertical rotary coupler and the bottom end of the vertical rotary coupler is mounted to the top of the pedestal. The boom rotates on one end of the horizontal rotary coupler. The bracket carries the control cabinet and the boom retraction device with one end thereof affixed to a boom retraction mount depending from the bracket.

Another object of this invention is to provide an electric service crane with an arcuate stop, a fixed stop wherein the arcuate stop cooperates with the fixed stop to limit movement of the boom to 340 degrees.

A primary goal of this invention is to provide an electric service crane wherein a boom is a hollow pipe having an electric service cable threaded therethrough the electric service cable connected to a control cabinet which in turn is electrically connected to an electric service source.

A significant feature of this invention is to provide an electric service boom that allows the operator thereof to move an electric service connector in X, Y, Z motions as well as extend the electric service connector away from the end of a boom.

A main purpose of this invention is to provide an electric service crane with a boom retraction comprises a hydraulic cylinder provided with a release mechanism wherein the release mechanism is an electronic solenoid valve disposed within a release line connected to upper and lower ports of the hydraulic cylinder. The release mechanism may also be operated by a manually operable knob affixed to the electronic solenoid valve.

A primary principle of this invention is to provide an electric service crane wherein an electric service cable is provided with a service port compliant connector and a proof circuit.

Still another principle of this invention is to provide an electric service crane wherein a service port compliant connector is provided with a release actuation circuit connected to a release mechanism to retract a boom to a storage position.

DESCRIPTION OF THE PREFERRED EMBODIMENTS

Figure 1:
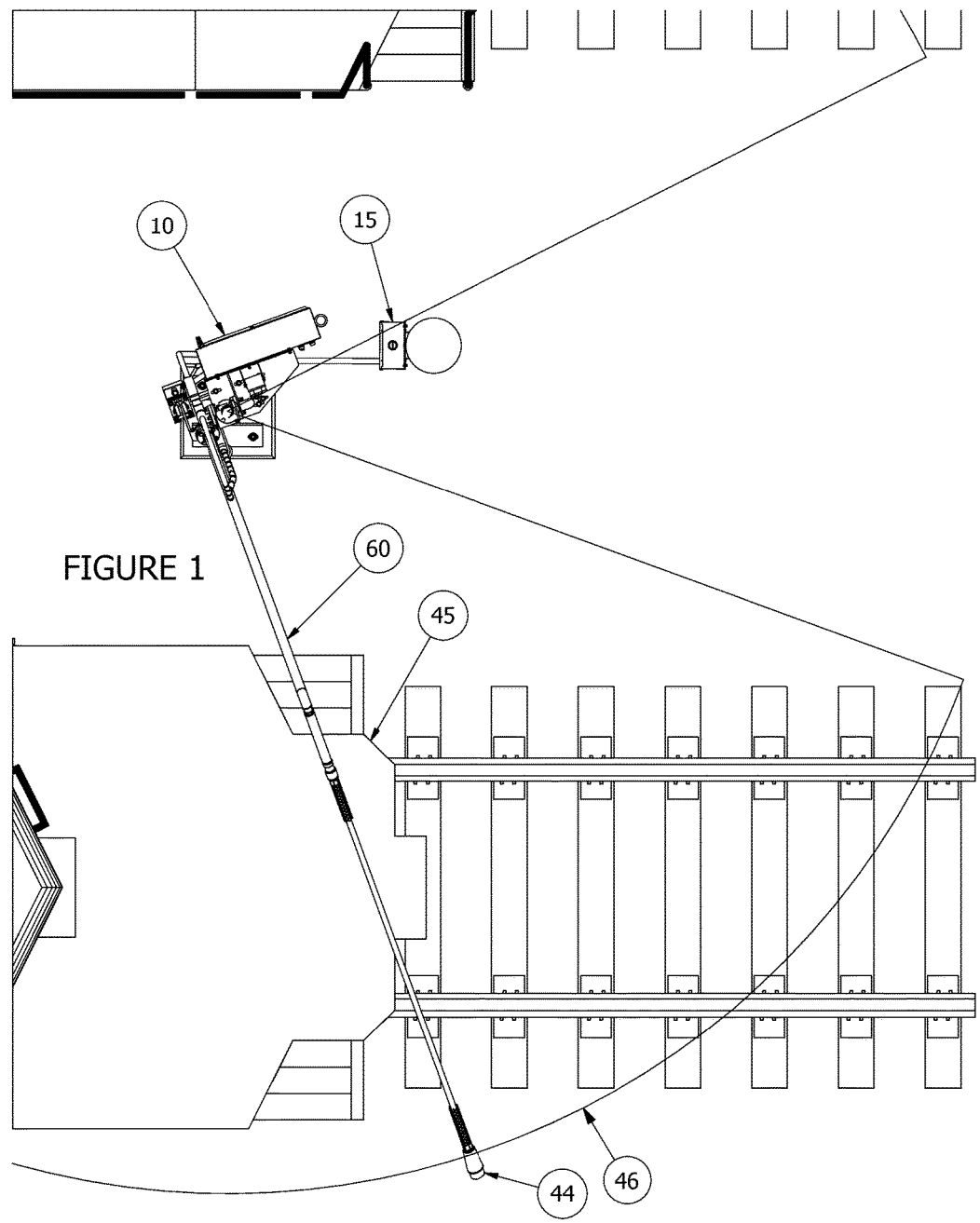
FIG. 1 is a top plan view of the preferred embodiment of the electric service crane positioned between two railroad tracks and showing a radius of service reach.

Referring now to FIGS. 1-4, an electric service crane for providing electric service to idle vehicles such as locomotives 45 is generally shown by the number 10. Electric service crane 10 comprises a base 11, a pedestal 12, a mounting bracket 13, a boom 14, an electric service cable 36 and an electric service source 15. Base 11 supports pedestal 12 in a vertical attitude, pedestal 12 provided with one end 16 of a first rotary coupler 17 fixed to an upper end 18 thereof. Mounting bracket 13 is rotatably mounted to an opposed end 19 of first rotary coupler 17, mounting bracket 13 carrying a service cabinet 20, a control panel 30, a second rotary coupler 21, a boom retraction mount 22 and a cable storage hook 23. Service cabinet 20 is affixed to a first vertical wall 24 of mounting bracket 13 and control panel 30 is affixed to a face 25 of service cabinet 20.

Second rotary coupler 21 is affixed to a second vertical wall 26 of mounting bracket 13, second vertical wall 26 generally perpendicular to mounting bracket 13 and first vertical wall 24. Though it is within the scope of this invention to directly mount second rotary coupler 21 to second vertical wall 26 and first rotary coupler 17 directly to mounting bracket 13, preferably a rigid elbow 65 is disposed between first rotary coupler 17 and second rotary coupler 21, rigid elbow 65 having one end 66 affixed to opposed end 19 of first rotary coupler 17 with bolts through mounting bracket 13 and a second end 67 affixed to second rotary coupler 21 with bolts through second vertical wall 26. Thus, rigid elbow 65 provides additional support to boom 14. Boom retraction mount 22 extends from a bottom surface 27 of mounting bracket 13 and is so arranged to permit boom 14 to be disposed between boom retraction mount 22 and second vertical wall 26 of mounting bracket 13. A boom retraction device 28 has one end 29 rotatably affixed to boom retraction mount 22 and a second end 31 rotatably affixed to a radius arm 32 wherein radius arm 32 has its other end 33 thereof rigidly affixed to a boom coupler 34. Cable storage hook 23 extends horizontally from a front edge 35 of mounting bracket 13 and is adapted to receive the free end 39 of electric service cable 36 therein when electric service crane 10 is idle in a vertical storage position 59. Boom coupler 34 with boom 14 extending therefrom is rotatably affixed to second rotary coupler 21 wherein first rotary coupler 17 and second rotary coupler 21 provide a multiple axis mechanism 80 for multiple axis movement of boom 14, that is, rotation about a vertical axis to provide for X, Y movement, tilting of boom 14 to provide for movement from the Z axis and extension of electric service cable 36 from an end 38 of boom 14 for lateral movement away from electric service crane 10. Electric service cable 36 is threaded through boom 14 and extends from both ends 37, 38 thereof wherein a first end 40 of electric service cable 36 is electrically connected to service cabinet 20 and free end 39 of electric service cable 36 carries an electric service connector 41 thereon. Since electric service cable 36 extends from open end 38 of boom 14 at least a distance equal to the length of boom 14 from second rotary coupler 21 to a juncture 47 of a flexible strain relief 48 attached to open end 38 of boom 14, electric service connector 41 is movable in a fourth dimension laterally away from pedestal 12 generally in line with boom 14. Thus, the length of boom 14 and length of free end 39 of electric service cable 36 provides a reach of substantial radius 46 from pedestal 12 to electric service connector 41. For instance, in a rail yard, the distance between tracks can range from about 17 feet to about 30 feet so a reach of about 20 feet from pedestal 12 to an electric service port 44 on an idle locomotive 45 is required. Generally, additional electric service cranes 10 are centrally located between adjacent rail lines as the preferred electrical service crane 10 of this invention is shown in FIG. 1. As boom 14, mounting bracket 13 and boom retraction device 28 of electric service crane 10 rotate as a single unit about pedestal 12 on first rotary coupler 17, electric service connector 41 is able to reach idle locomotives 45 on either track. In order to prevent electric service crane 10 from entangling with electric service source 15 and to prevent damage to either electric service cable 36 or electric supply cable 49, an arcuate stop 57 is affixed to opposed end 19 of first rotary coupler 17 at mounting bracket 13. Arcuate stop 57 depends downwardly toward one end 16 of first rotary coupler 17 and one end 18 of pedestal 12 is provided with a fixed stop extending upwardly therefrom. Arcuate stop 57 is therefore adapted to engage the fixed stop when electric service crane 10 is moved around pedestal 12 toward electric service source 15. Arcuate stop 57 may be any size however, arcuate stop 57 and the fixed stop limit electric service crane 10 from approaching electric service source 15 by about ten degrees arc on either side of electric service source 15.

Figures 2A, 2B:
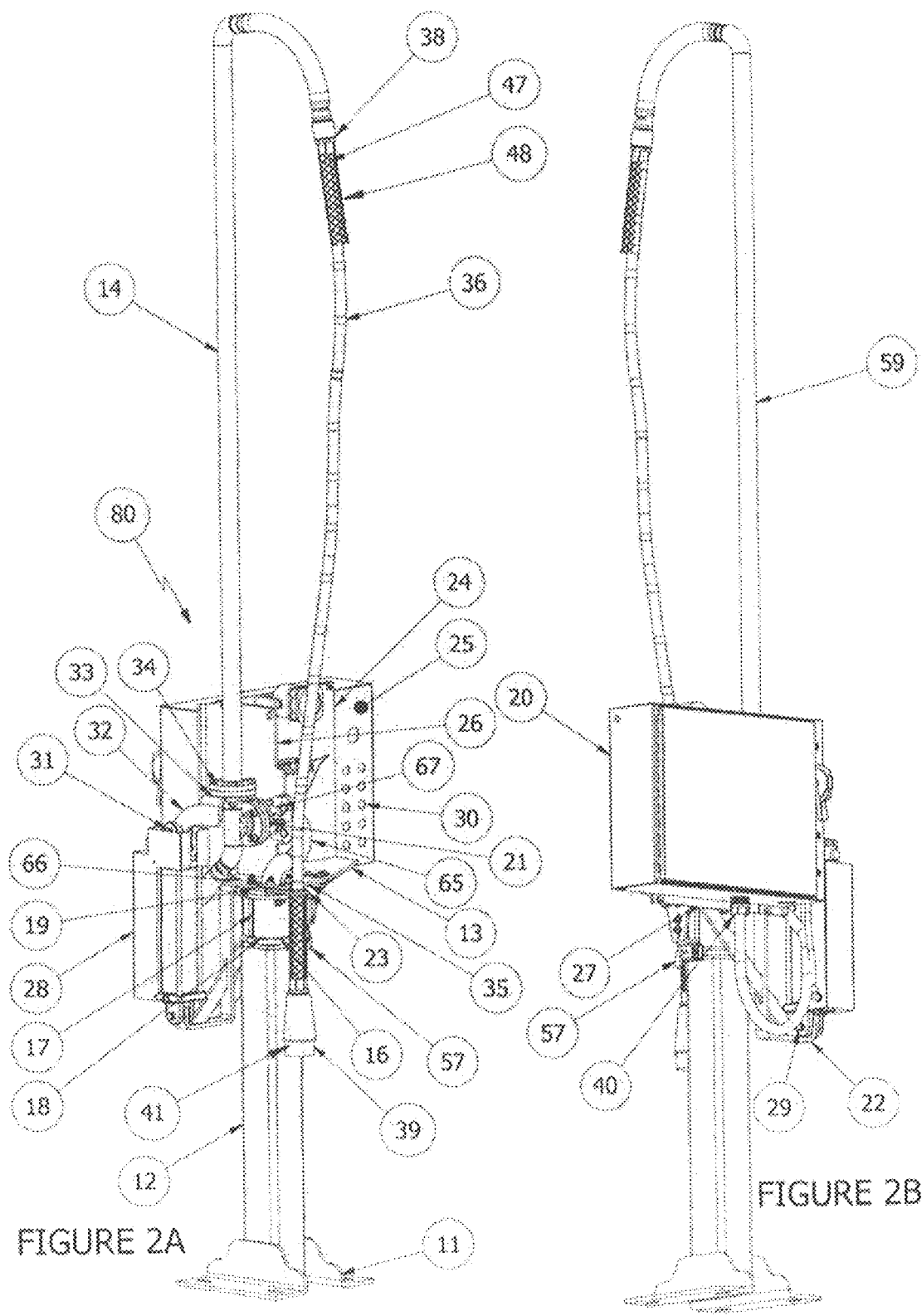
FIG. 2A is a left frontal perspective view of the preferred embodiment of the electric service crane of this invention.
FIG. 2B is a right rear perspective view of the preferred embodiment of the electric service crane of this invention.
Figure 3:
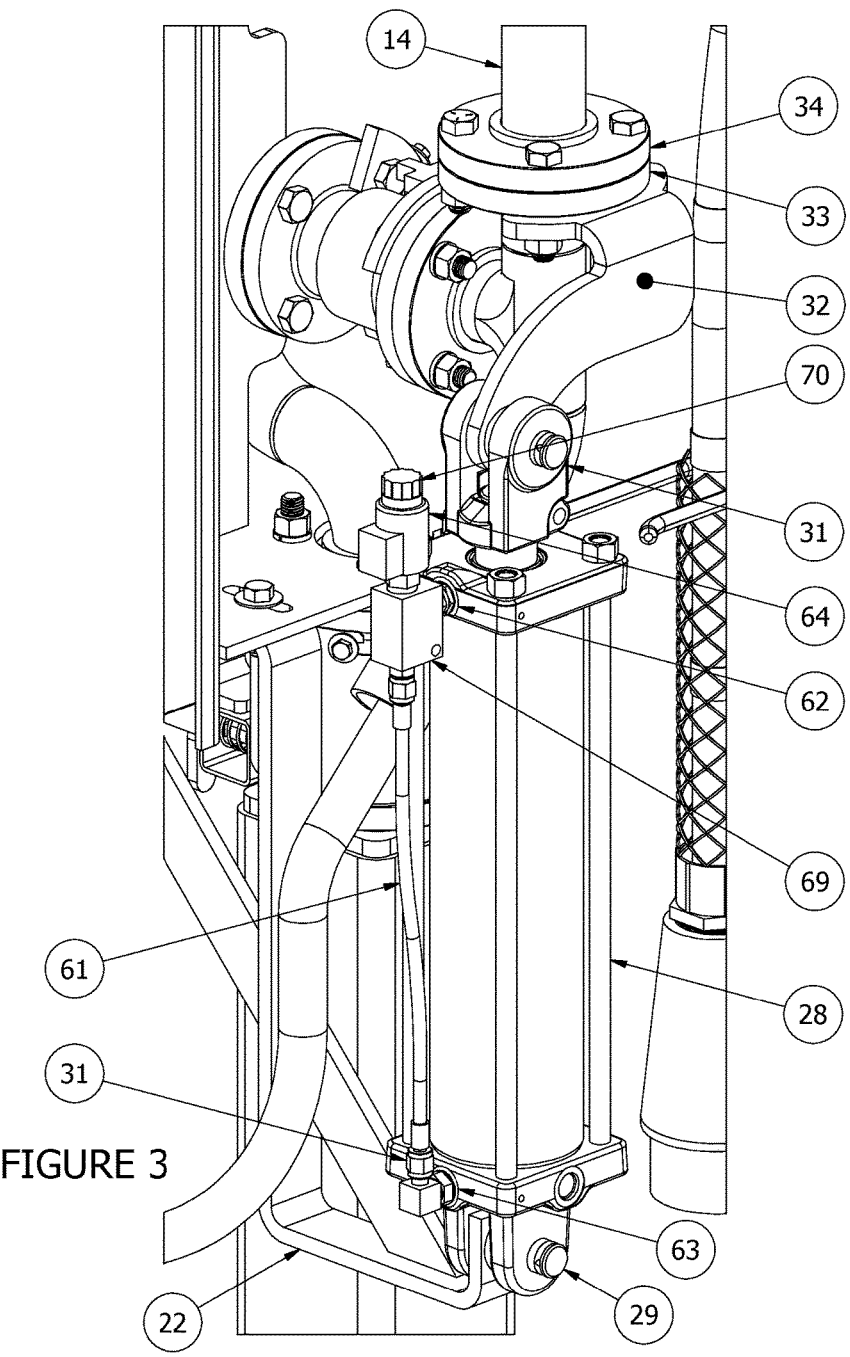
FIG. 3 is an enlarged perspective view of the preferred embodiment of the retraction device and preferred embodiment of the release mechanism of the electric service crane of FIG. 1.
Figure 4:
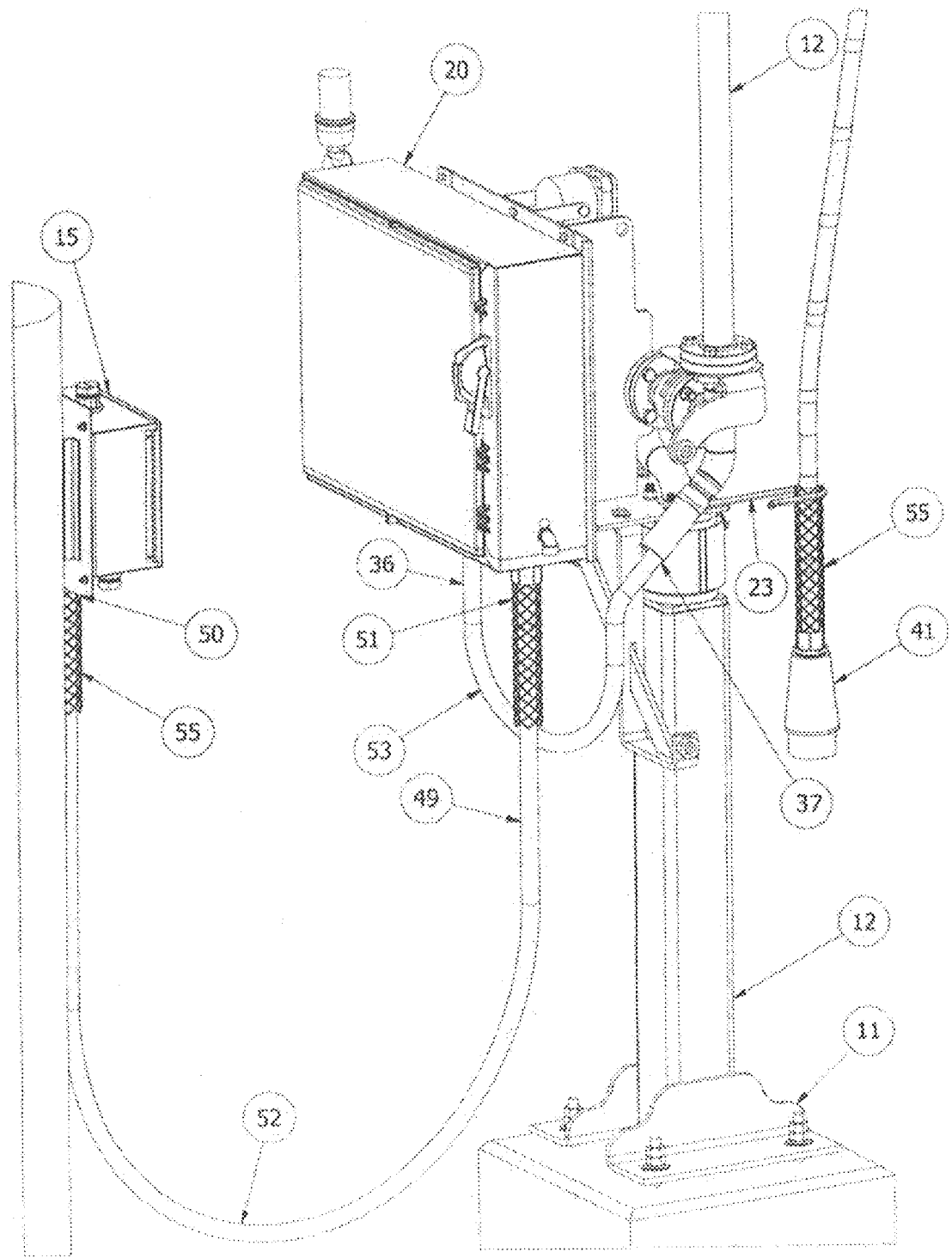
FIG. 4 is an enlarged right rear perspective view of the control cabinet, electric service source cable, second rotary coupler and portions of the electric service boom and electric service cable of the electric service crane of FIG. 1 with the retraction device removed to provide clarity.

Referring also to FIG. 4, electric service source 15 is mounted adjacent to, but spaced from electric service crane 10 to allow for free movement of electric service crane 10 from a locomotive 45 on one track adjacent electric service source 15 to a locomotive 45 on another track thereof. Electric service source 15 is connected to electric service cabinet 20 with an electric supply cable 49, electric supply cable 49 having sufficient length with a catenary 52 between a connection 50 on electric service source 15 and a connection 51 on service cabinet 20 of electric service crane 10 to accommodate rotation of electric service crane 10 within an arc of at least 340 degrees without contacting electric service source 15. Electric service cable 36 also has a catenary 53 depending from one end 37 of boom 14 to service cabinet 20 to allow for movement of one end 37 of boom 14 in an arc from a vertical storage position 59 as shown in FIGS. 2A & 2B to a deployed position 60 as shown in FIG. 1. Flexible strain relief 48 surrounds electric service cable 36 from juncture 47 downstream on electric service cable 36 wherein flexible strain relief 48 may be frictionally attached to electric service cable 36 to prevent undue strain on electric service cable 36 at juncture 47. Likewise, a strain relief 55 is provided on electric supply cable 49 at electric service source 15 and frictionally engaged with electric supply cable 49 a distance from connection 50 on electric service source 15.

Electric service crane 10 is deployed manually by gripping electric service connector 41, releasing electric service cable 36 from cable storage hook 23 and pulling on electric service connector 41 to tip boom 14 from vertical storage position 59 to deployed position 60. Electric service crane 10 is then rotated about pedestal 12 to align boom 14 with the electric service port 44 on an idle locomotive 45. Electric service connector 41 is extended to electric service port 44 and connected therewith. Electric service connector 41 and electric service port 44 have cooperating locking mechanisms to fixedly retain electric service connector 41 on electric service port 44, however these cooperating locking mechanisms are not adapted to be strained by allowing boom 14 to apply a load thereto. Accordingly, boom 14 may be extended because a foot valve in the hydraulic piston within boom retraction device 28 permits fluid to pass from above the piston to below the piston but prevents reverse movement of fluid thus retaining boom 14 in deployed position 60. Thus, boom 14 may be held at any angle from just beyond vertical to nearly horizontal by prohibiting hydraulic fluid within boom retracting device 28 from flowing from a bottom side of a piston to the top side of the piston. Because fluid can only flow one way, boom 14 of electric service crane 10 is then held at the angle commensurate with the length of extension of electric service connector 41 to electric service port 44. The piston within boom retraction device 28 is biased toward end 29 of boom retraction device 28 thus providing a biasing force to return boom 14 to upright vertical storage position 59 but boom retraction device 28 becomes hydraulically locked by passage of the fluid from above the piston to below the piston. Since boom retraction device 28 may be extended thus allowing boom 14 to be tipped from vertical but does not allow return of boom 14 to its vertical storage position 59, a release of fluid from below the piston to above the piston is required. Therefore, referring specifically to FIG. 3, a release line 61 is affixed to both inlet ports 62, 63 at ends 29, 31 respectively of boom retraction device 28 and a release mechanism 64 is inserted into release line 61 to permit fluid to pass from below the piston of boom retraction device 28 to above the piston of same. Release mechanism 64 preferably is an electronic solenoid valve 69 disposed within release line 61. Electronic Solenoid valve 69 is provided with a manual release knob 70 to manually allow boom retraction device 28 to return vertical storage position 59. Electronic solenoid valve 69 is electrically connected to at least one circuit within electric service connector 41 through and into a loop circuit within electric service port 44. Upon disconnection of electric service connector 41 from electric service port 44 on locomotive 45, electronic solenoid valve 69 releases fluid from above the piston of release mechanism 64 to below the piston through release line 61. Therefore, the operator of electric service crane 10 easily returns electric service crane 10 to vertical storage position 59. Electric service connector 41 is then replaced behind cable storage hook 23 and retained therebehind until further use is required. Manual release knob 70 allows an operator of electric service crane 10 to return electric service crane 10 to a storage position in case of loss of electrical power. It is apparent therefore that by slowly retracting boom 14 to vertical storage position 59 dragging of electric service connector 41 and/or electric service cable 36 on the ground is prevented as contrasted with prior art electric service means.

Electric service crane 10 is provided with an electric proof circuit to ensure proper electrical connection is made between electric service connector 41 and electric service port 44. The proof circuit checks for proper ground, polarity and crossed wires within idle locomotive 45 by sending a low voltage signal through the proof circuit and returning the low voltage signal through each wire connected to electric service port 44. Control panel 30 has indicator lights displayed thereupon to provide a visual indication to the operator of electric service crane 10 that all circuit connections are proper before actuation of full power to electric service crane 10. Control panel 30 also has circuitry within to prevent actuation of full power when a fault is detected by the proof circuit.

Though the foregoing description focuses on idle locomotives in a rail yard, it is fully within the scope of this invention to use electric service crane 10 to provide power to other idle equipment such as boats, ships, automobiles, trucks, airplanes and construction equipment. It is also within the scope of this invention to use electric service crane 10 to provide charging power to electric vehicles in a charging station.

While the present invention has been described with reference to the above described preferred embodiments and alternate embodiments, it should be noted that various other embodiments and modifications may be made without departing from the spirit of the invention. Therefore, the embodiments described herein and the drawings appended hereto are merely illustrative of the features of the invention and should not be construed to be the only variants thereof nor limited thereto.

We claim:

1. An electric service crane comprising a boom, a multiple axis mechanism, a service cabinet, a control panel, a boom retraction device, a release mechanism, a base, a pedestal, a mounting bracket, an electric service source, an electric supply cable, an electric service cable, an electric connector and a cable storage hook, said base supporting said pedestal in a vertical attitude, said pedestal rigidly affixed to said base, said multiple axis mechanism rotatably mounted on said pedestal, said multiple axis mechanism further comprises an elbow, said boom rotatably mounted on one end of said multiple axis mechanism and movable about a horizontal axis from a stored position to a deployed position, said service cabinet mounted on the mounting bracket, said mounting bracket affixed to an opposite end of said elbow, said boom having said boom retraction device affixed to a lower end of said boom and has one end of said electric service cable hanging freely from a free end of said boom, said one end of said electric service cable terminated with an electric service connector, said electric supply cable disposed through said boom through said elbow and into said service cabinet, said electric supply cable affixed to said electric service source and to said service cabinet, said electric service crane providing auxiliary power to idle motive equipment.

2. An electric service crane comprising a base, a pedestal, a mounting bracket, a boom and an electric service source, said base supporting said pedestal in a vertical attitude, said pedestal provided with one end of a first rotary coupler fixed to an upper end of said pedestal, said mounting bracket rotatably mounted to an opposed end of said first rotary coupler, said mounting bracket carrying a service cabinet, a control panel, a second rotary coupler, a boom retraction mount and a cable storage hook, said service cabinet affixed to a vertical wall of said mounting bracket, said control panel affixed to a face of said service cabinet, said second rotary coupler affixed to a vertical support of said mounting bracket, said boom retraction mount extending from a bottom surface of said mounting bracket, a boom retraction device having one end affixed to said boom retraction mount and a second end affixed to a radius arm, a second end of said radius arm affixed to said boom, said cable storage hook extending horizontally from a front edge of said mounting bracket, said boom rotatably affixed to said second rotary coupler, an electric service cable threaded through said boom extending from both ends wherein a first end of said electric service cable is electrically connected to said service cabinet and a second end of said electric service cable carrying an electric connector thereon, said boom retraction device provided with a release mechanism affixed thereto, said release mechanism returning said boom to an upright storage position upon actuation of said release mechanism.

3. An electric service crane as in claim 2 wherein said vertical support is a second vertical wall of said mounting bracket wherein said second rotary coupler is directly affixed thereto.

4. An electric service crane as in claim 2 wherein said vertical support is an elbow, said elbow having one end affixed to said first rotary coupler and said mounting bracket and a second end of said elbow affixed to said second rotary coupler.

5. An electric service crane comprising a mounting pedestal, a vertically disposed rotary coupler, a horizontally disposed rotary coupler, a bracket, a service cabinet, an electric service boom and a boom retraction device, said bracket affixed to a top end of said vertically disposed rotary coupler, a bottom end of said vertically disposed rotary coupler mounted to said mounting pedestal, said electric service boom rotatably mounted to one end of said horizontally disposed rotary coupler, an opposed end of said horizontally disposed rotary coupler mounted to said bracket, said bracket carrying said control cabinet wherein said boom retraction device has one end of said boom retraction device affixed to a boom retraction mount depending from said bracket and an opposite end of said boom retraction device affixed to said electric service boom.

6. The electric service crane as in claim 5 wherein said bracket is provided with an arcuate stop.

7. The electric service crane as in claim 6 wherein said mounting pedestal is provided with a fixed stop.

8. The electric service crane as in claim 7 wherein said arcuate stop cooperating with said fixed stop to limit movement of said electric service boom to 340 degrees.

9. The electric service crane as in claim 8 wherein said electric service boom further comprises a hollow pipe, said hollow pipe having an electric service cable threaded therethrough.

10. The electric service crane as in claim 9 wherein said boom retraction device further comprises a hydraulic cylinder.

11. The electric service crane as in claim 10 wherein said boom retraction device is provided with a release mechanism.

12. The electric service crane as in claim 11 wherein said release mechanism is an electronic solenoid valve disposed within a release line connected to upper and lower ports of said hydraulic cylinder.

13. The electric service crane as in claim 12 wherein said electric solenoid valve is actuated upon disconnection of said electric service cable from a locomotive.

14. The electric service crane as in claim 12 wherein electronic solenoid valve of said release mechanism is provided with a manually operable knob.

15. The electric service crane as in claim 12 wherein release mechanism permits flow of fluid from above an internal piston within said hydraulic cylinder to below said internal piston.

16. The electric service crane as in claim 5 wherein said electric service cable is electrically connected to said service cabinet.

17. The electric service crane as in claim 16 wherein said electric service cable is provided with a service port compliant connector.

18. The electric service crane as in claim 17 wherein said service cabinet is electrically connected to an electric service source.

19. The electric service crane as in claim 18 wherein said service cabinet further comprises a control panel.

20. The electric service crane as in claim 19 wherein said control panel is provided with a proof circuit.

\* \* \* \* \*